(12) United States Patent  
Davis

(10) Patent No.: US 6,205,547 B1
(45) Date of Patent: Mar. 20, 2001

(54) COMPUTER SYSTEM MANAGEMENT APPARATUS AND METHOD

(75) Inventor: Edward L. Davis, Milwaukie, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/197,384

(22) Filed: Nov. 20, 1998

(51) Int. Cl.$^7$ ....................................................... G06F 1/24
(52) U.S. Cl. ........................................................ 713/1; 713/1
(58) Field of Search ............................................... 713/1, 2

(56) References Cited

U.S. PATENT DOCUMENTS

| | | | |
|---|---|---|---|
| 4,752,697 | * 6/1988 | Lyons et al. ............................ | 290/2 |
| 5,455,933 | * 10/1995 | Schieve et al. ....................... | 395/183 |
| 5,588,109 | * 12/1996 | Dickinson et al. .................... | 395/326 |
| 5,678,002 | * 10/1997 | Fawcett et al. ....................... | 395/183 |
| 5,927,050 | * 7/1999 | Houck et al. ........................... | 53/428 |
| 5,974,547 | * 10/1999 | Klimenko ................................. | 713/2 |
| 5,978,911 | * 11/1999 | Knox et al. ............................. | 713/1 |
| 5,978,912 | * 11/1999 | Rakavy et al. ......................... | 713/2 |
| 6,009,274 | * 12/1999 | Fletcher et al. ........................ | 717/11 |
| 6,038,690 | * 3/2000 | Jacobson et al. ...................... | 714/49 |

* cited by examiner

Primary Examiner—Thomas Lee
Assistant Examiner—Nitin Patel
(74) Attorney, Agent, or Firm—Trop, Pruner + Hu, P.C.

(57) ABSTRACT

A system management controller may record and/or modify the state of the computer system's host processor if it fails to execute user level program instructions (e.g., is hung). The system management controller may also be commanded, from a site remote from the computer system, to acquire and/or modify the state of the host processor. The system management controller may also acquire and/or modify the state of the other components coupled to the computer system such as, for example, a modem, a network interface card, a memory, and a bus-to-bus bridge circuit.

33 Claims, 5 Drawing Sheets

COMPUTER SYSTEM MANAGEMENT APPARATUS AND METHOD

BACKGROUND

The invention relates generally to an operating system independent mechanism to manage a computer system.

Users who purchase a computer system typically install it themselves, either at home or at work. Sometimes, setup problems arise during installation that prevent the purchaser from using the computer system. When an installation problem arises, the general practice is for the purchaser to call the computer system manufacturer's technical support line. If the problem cannot be resolved over the telephone, the unit may be sent back to the factory for inspection and/or repair. However, many units returned to the manufacturer have no detectable faults. The problem being the user did not follow instructions during setup and/or the technical support staff did not effectively communicate with the purchaser to determine the problem. In either case, the expense of inspecting and processing a non-defective computer system is high.

Once a computer system is installed and functioning, it may cease to operate properly. If the failed computer system is a stand-alone unit, the user may contact the computer system manufacturer to assist in troubleshooting. If the system cannot be corrected over the phone, it may be returned to the manufacturer for repair. If the failed computer system is coupled to a computer network, a technician may be dispatched to troubleshoot the unit. In either case, the cost of troubleshooting units, in terms of time, may be high.

Thus, there is a need for a mechanism that allows remote diagnosis and management of computer systems, regardless of whether they are installed as a stand-alone unit or coupled to a computer network.

SUMMARY

In one embodiment the invention provides a computer system comprising a main computing unit including a host processor, and a host bus coupled to the host processor, and a system management controller coupled to the main computing unit to determine an operational state of the main computing unit and, based on the determination, selectively regulate the main computing unit.

In another embodiment, the invention provides a method to manage a computer system having a host processor comprising receiving a signal indicative of an operating mode of the computer system, and determining if the signal indicates the computer system is operating in a normal mode and, if it is not, then regulating the computer system independently of the host processor. Methods in accordance with the invention may be stored in any media that is readable and executable by a computer system.

DETAILED DESCRIPTION

An apparatus and associated methods to provide remote diagnosis and management of a computer system are described. The following embodiments of this inventive concept are illustrative only and are not to be considered limiting in any respect.

Figure 1:
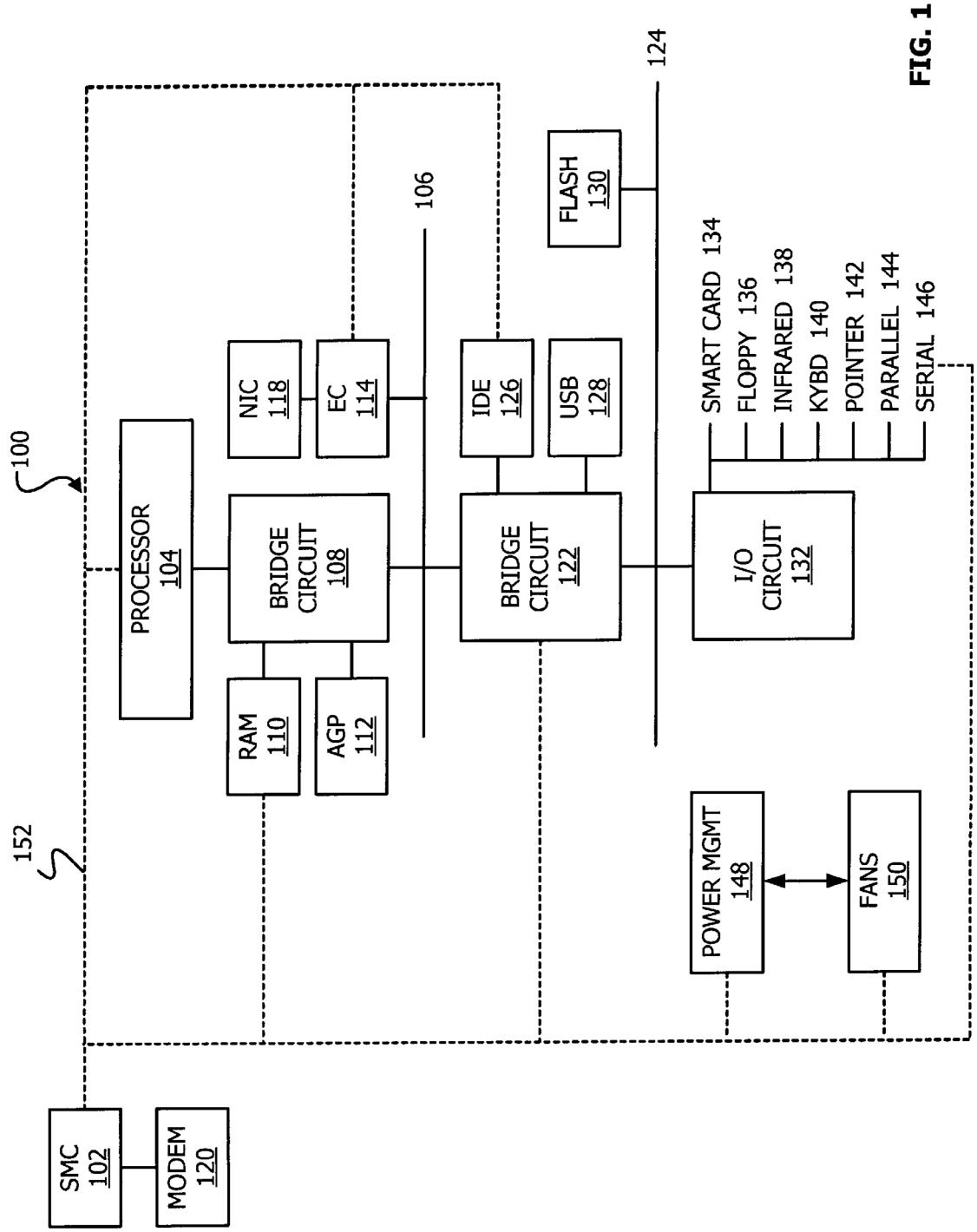
FIG. 1 shows a computer system incorporating a system management controller in accordance with one embodiment of the invention.

Referring to FIG. 1, an illustrative computer system 100 having system management controller (SMC) 102 is shown. Computer system 100 includes host processor 104 coupled to system bus 106 through bridge circuit 108. Illustrative host processors 104 include the PENTIUM® family of processors and the 80X86 families of processors from Intel Corporation of Santa Clara, Calif. One illustrative bridge circuit 108 is the 82443LX PCI-to-AGP controller manufactured by Intel Corporation. Bridge circuit 108 provides an interface to couple system random access memory (RAM) 110 and accelerated graphics port (AGP) 112 devices. Also coupled to system bus 106 is Ethernet controller (EC) 114. EC 114 may provide processor 104 with an interface to network interface card (NIC) 118. Illustrative EC 114s include the 82558 and 82559 devices manufactured by Intel Corporation.

Bridge circuit 122 couples system bus 106 to secondary bus 124, while also providing integrated device electronics (IDE) 126 and universal serial bus (USB) 128 interfaces. Common IDE devices include magnetic and optical disk drives. One illustrative bridge circuit 122 is the 82371AB PCI-to-ISA/IDE controller made by Intel Corporation. Also coupled to secondary bus 124 are FLASH memory 130 and input-output (I/O) circuit 132. Memory 130 may be used to store basic input-output system (BIOS) instructions for computer system 100. Input-output circuit 132 may provide smart card interface 134 (see the "Interoperability Specification for Integrated Circuit Cards and Personal Computer Systems," Rev. 1.0, December 1997), floppy disk interface 136, infrared ports 138, keyboard interface 140, pointer device ports 142, and parallel 144 and serial 146 ports. One illustrative I/O circuit is the SMC667 manufactured by Standard Microsystems Corporation of Hauppauge, New York.

In some computer systems, sensors (not shown) to monitor thermal conditions and/or power consumption within computer system 100 are coupled to power management device 148. Power management device 148 may also be coupled to elements within computer system 100 such as processor 104, NIC 118, and fans 150. Illustrative power management devices include the LM78 and LM79 devices from National Semiconductor Corporation and the ADM9240 device from Analog Devices Corporation.

System management controller 102 may be coupled to various elements in computer system 100 via bus 152. For example, SMC 102 may be coupled to processor 104, RAM 110, EC 114, bridge circuit 122, IDE devices via IDE port 126, memory 130 (via bridge circuit 122), power management device 148 and fans 150 via bus 152. Bus 152 may be, for example, a system management bus (SMBus) as specified by Intel Corporation ("System Management Bus Specification," Rev. 1.0, 1995), an inter-integrated circuit control bus (I²C) bus as specified by Phillips Semiconductors ("I²C Bus Specification," 1995), a parallel connection, or a combination of two or more of these types of interconnections. In addition, SMC 102 may be coupled to modem 120 via an industry standard architecture (ISA) bus interface or, alternatively, modem 120 may be a system bus compatible modem (such as a PCI bus modem), coupled to computer system 100 via bus 106 and SMC 102 via bus 152. In another embodiment, SMC and modem 120 are coupled to communicate through secondary bus 124.

Figure 2:
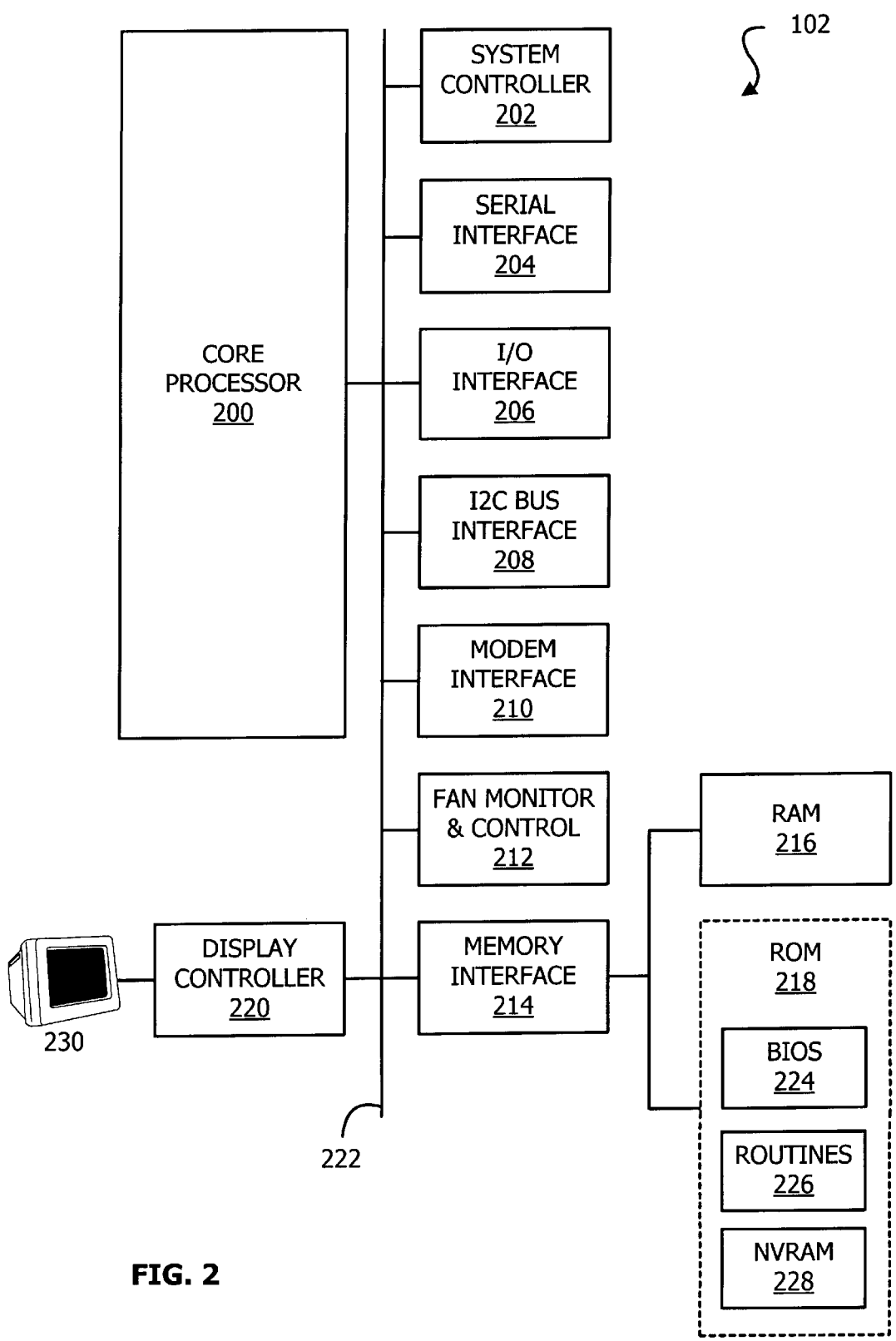
FIG. 2 shows a system management controller architecture in accordance with one embodiment of the invention.

Referring to FIG. 2, SMC 102 may itself be a computer system that includes core processor 200, system controller 202, serial interface 204, I/O interface 206, I²C bus interface 208, modem interface 210, fan monitor and control circuit 212, memory interface 214, RAM 216, ROM 218, and display controller 220 coupled through local bus 222.

In one embodiment of the invention, core processor 200 is a 80386 processor manufactured by Intel Corporation and bus 222 is compatible with the 80386 bus interface standard. System controller 202 may provide, for example, bus arbitration and control, core processor 200 interrupt control, and SMC timer functionality. Serial interface 204 may provide, for example, connectivity to serial port 146 (see FIG. 1) through a programmable baud rate port such as a programmable RS-232 port. I/O interface 206 may provide general purpose input-output (GPIO) capability including sensor input (e.g., thermal sensors and computer system 100 enclosure open/close sensors) and device control signal output. I²C interface 208 may provide connectivity to computer system 100 elements such as processor 104, EC 114, RAM 110, bridge circuit 122, and IDE port 126 devices as shown in FIG. 1. Modem interface 210 may provide electrical coupling to modem 120 through a standard ISA bus interface (e.g., 8 data bits, 16 address bits, and 4 control bits). Fan monitor and control circuit 212 may provide the capability to determine fan 150 speed and to generate fan speed control signals (e.g., pulse width modulated signals). Memory interface 214 may provide access to RAM 216 and ROM 218 through, for example, the MICROWIRE® bus interface as described by National Semiconductor Corporation. In one embodiment, ROM 218 is internal to SMC 102 while, in another embodiment, ROM 218 is external to SMC 102. ROM 218 may include BIOS instructions 224 for core processor 200, operating routines 226 to instruct core processor 200 how to process input signals from and transmit output signals to various computer system 100 elements, and nonvolatile random access memory (NVRAM) 228 for SMC operational data such as an internet address of computer system 100. Display controller 220 may provide, for example, video memory and control circuitry to drive video display 230. Display 230 may be used in some embodiments so that a user may view what operations (and their results) SMC 200 is performing.

In one embodiment, SMC 102 may operate in one of two modes: enabled and disabled. When enabled, SMC 102 may actively query and/or modify elements within computer system 100 such as processor 104 state. When disabled, SMC 102 is generally passive, monitoring computer system 100 operations and data to/from NIC 118 (via EC 114) and modem 120 (via bus 152). For example, when in the disabled mode SMC 102 may pass through all data received from modem 120 to bridge circuit 122 via bus 152. Similarly, SMC 102 may monitor all data passing through EC 114. Monitoring provides SMC 102 with the ability to identify specified data patterns occurring in data streams passing through EC 114 and modem 120. When one of these predefined patterns is detected, SMC 102 may transition to the enabled state. In this manner, a remote device may command the SMC into, or out of the enabled state. If processor 104 is executing an advanced configuration and power interface specification (ACPI) operating system, these predefined patterns may be specified by the device class power management reference specification. (See the "Advanced Configuration and Power Interface Specification," Rev. 1.0, 1996, published by Intel Corporation.)

Figure 3:
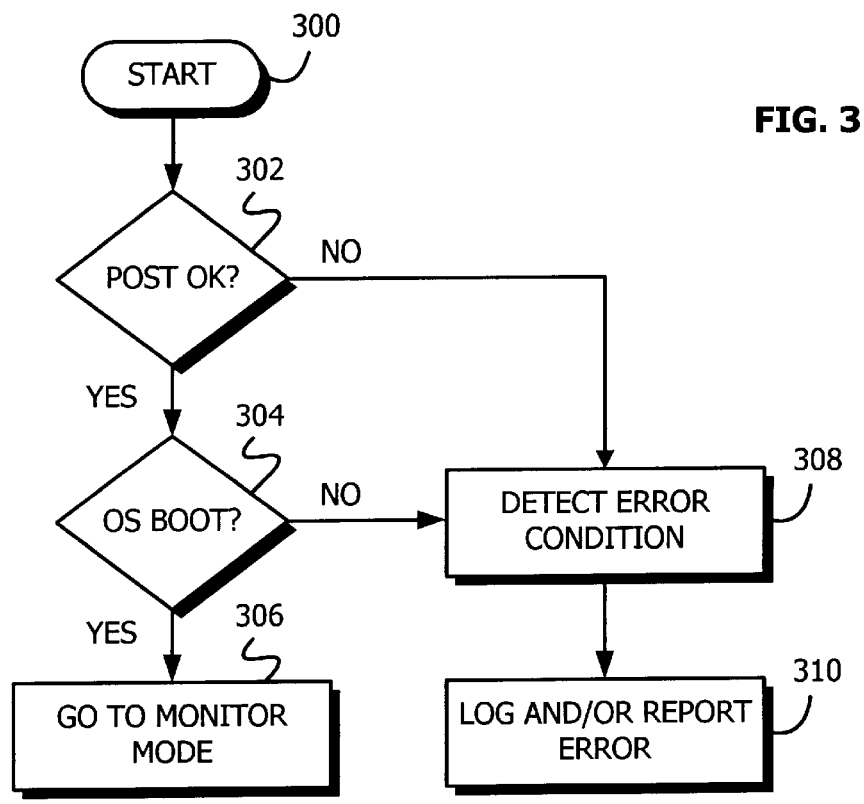
FIG. 3 shows a computer system start-up method in accordance with one embodiment of the invention.

Referring to FIG. 3, on computer system 100 power-up or reset operations SMC 102 is enabled (Step 300). If power-on self test processing and operating system (OS) boot operations are successful (the 'yes' prongs of steps 302 and 304), SMC 102 may enter a monitor only (e.g., disabled) state (step 306). If computer system 100 fails to successfully complete either POST or OS boot procedures (the 'no' prongs of steps 302 and 304), SMC 102 detects this (step 308) and, thereafter, may capture the state of processor 104 to a log file and contact a remote device via NIC 118 or modem 120 to report the problem (step 310). On start-up error detection, SMC 102 may also detect and report many types of errors before the system boots. For example, SMC 102 may detect whether processor 104 ceases to execute instructions during POST or OS load operations (e.g., "hangs"), by monitoring processor 104 interrupt and system management event (SME) signals. (See the ACPI specification referenced above.) In one embodiment, each time SMC 102 detects processor 104 processing an interrupt or system management event, it resets a watchdog timer (e.g., internal to core processor 200). If the watchdog timer expires before being reset (i.e., before processor 104 responds to another interrupt or system management event), processor 104 is deemed hung and SMC becomes enabled. An illustrative watchdog timer period may be approximately 30 seconds.

Referring again to FIG. 2, operating routines 226 may comprise a plurality of software program modules to: communicate with serial port 146 through serial interface 204; process input signals from, and generate output signals to, devices coupled to I/O interface 206; determine and modify the state of processor 104, system RAM 110, EC 114, bridge circuit 122, devices coupled to IDE port 126, and memory 130 through I²C interface 208; communicate with modem 120 through modem interface 210; monitor and control fans 150 through fan monitor and control circuit 212; and read from and write to the BIOS 224, program routines 226, and NVRAM 228 portions of ROM 222.

Communication programs (in either BIOS 224 and/or routines 224 may, for example, allow SMC 102 to receive and transmit data via NIC 118 and modem 120 independent of host processor 104. (Known communication protocols such as the transport control protocol (TCP), the internetwork packet exchange (IPX) protocol, and the network basic input-output system extended user interface (NETBEUI) protocol may be used.) One significant benefit of this capability is that a remote entity (e.g., a technician helping a user troubleshoot their computer system, or a computer system security manager) may contact and query computer system 100 to determine its state—thus providing accurate and detailed state information about computer system 100. Thus, SMC 102 may regulate the behavior of computer system 100 by determining and modifying the state of various system components (e.g., processor 104 state).

When enabled, event routines 226 may allow SMC 102 to handle specified events such as when the temperature of computer system 100 exceeds a preset thermal limit (e.g., indicated via sensor input received through I/O interface 206 or fan monitor and control circuit 212), or when processor 104 fails to boot properly or ceases to execute user program instructions, or when computer system 100's enclosure is opened (e.g., indicated via sensor input received through I/O interface 206), or when computer system 100's power supply—voltage and/or current—fall outside specified limits (e.g., indicated via sensor input received through I/O interface 206).

Figure 4:
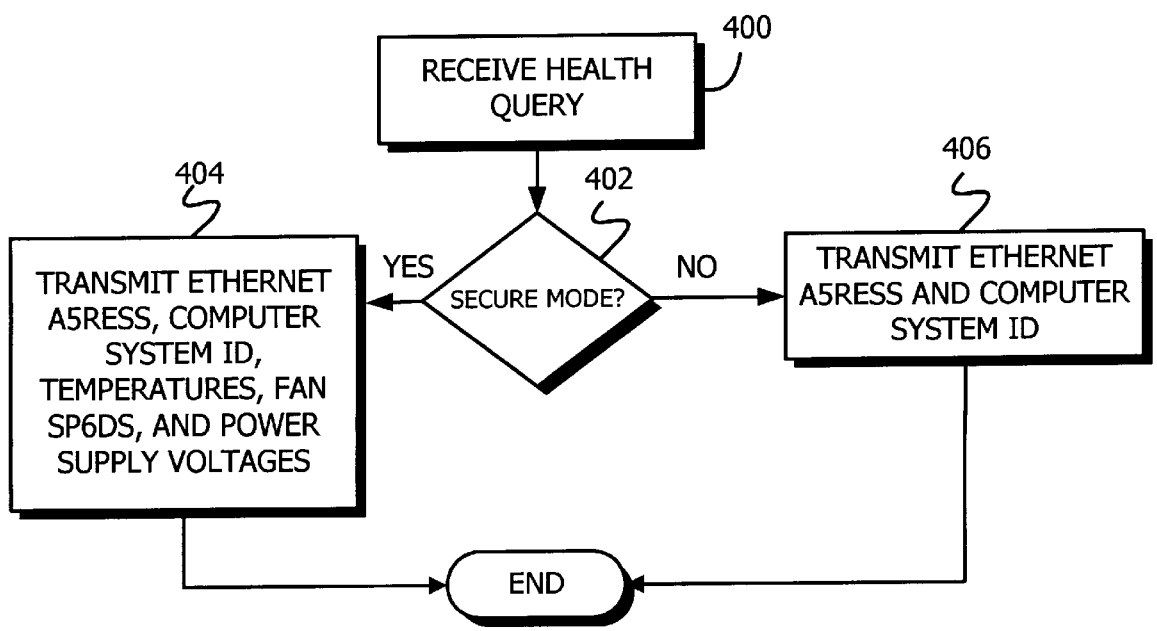
FIG. 4 shows a health query response method in accordance with one embodiment of the invention.

Each of these events, may trigger a different action from SMC 102. Referring to FIG. 4 for example, if an enabled SMC 102 receives a health query from a remote computer system (step 400), it may respond with some or all of the following information: host computer system 100's identification (e.g., serial) number and network (e.g., Ethernet) address; various measured temperatures (e.g., from sensor input via I/O interface 206); fan speeds (e.g., from fan monitor and control circuit 212); and power supply voltages (e.g., via power management device 148) (step 404).

Figure 5:
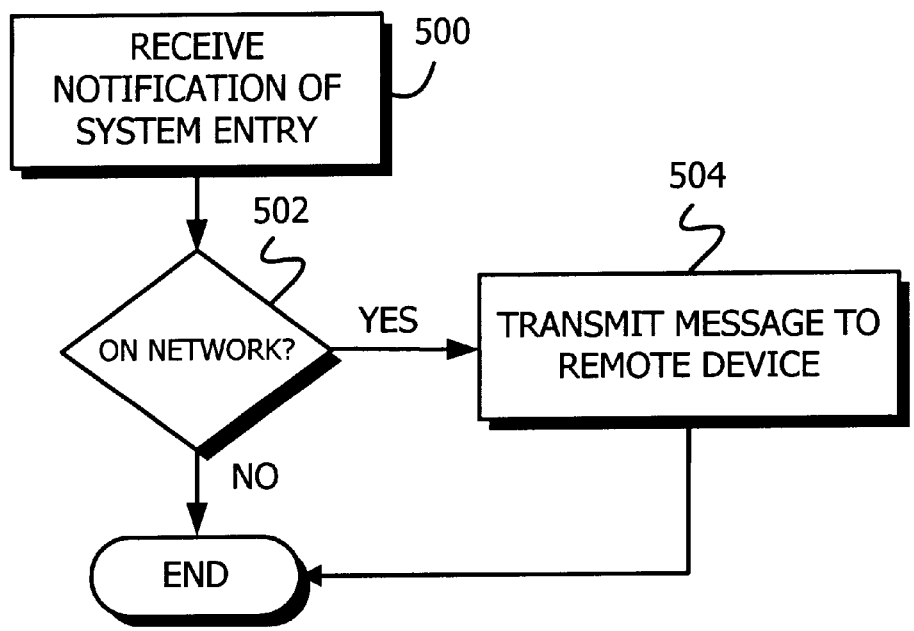
FIG. 5 shows a computer system enclosure security method in accordance with one embodiment of the invention.

Referring now to FIG. 5, if an enabled SMC 102 detects that computer system 100's enclosure has been opened (e.g., from sensor input via I/O interface 206) at step 500, and computer system 100 is coupled to a computer network (the 'yes' prong of step 502), a message identifying the SMC and/or computer system 100 and an indication of the event may be transmitted to another computer system on the network, such as a remote security management system (step 504). If computer system 100 is not coupled to a computer network (the 'no' prong of step 502), event processing may terminate. Alternatively, SMC 102 may generate log entries for each detected event, or a specified subset thereof. Error logging may be to a standard text file and may be used for all event processing (e.g., health query response).

Figure 6:
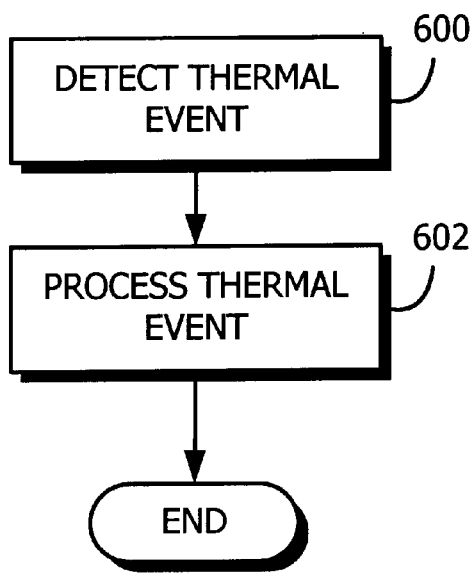
FIG. 6 shows a thermal event response method in accordance with one embodiment of the invention.

Thermal events may be processed in accordance with the illustrative embodiment outlined in FIG. 6. If an enabled SMC 102 detects a thermal event such as, for example, a high temperature set point being exceeded (e.g., from thermal sensors through I/O interface 206) at step 600, it may process the thermal event (step 602) by commanding fans 150 to modify their speed. Thermal event processing may also include powering down processor 104 or other system elements such as, for example, modem 120, or EC 114. As described above, SMC 102 may also log the thermal event and any action taken in a log file.

Figure 7:
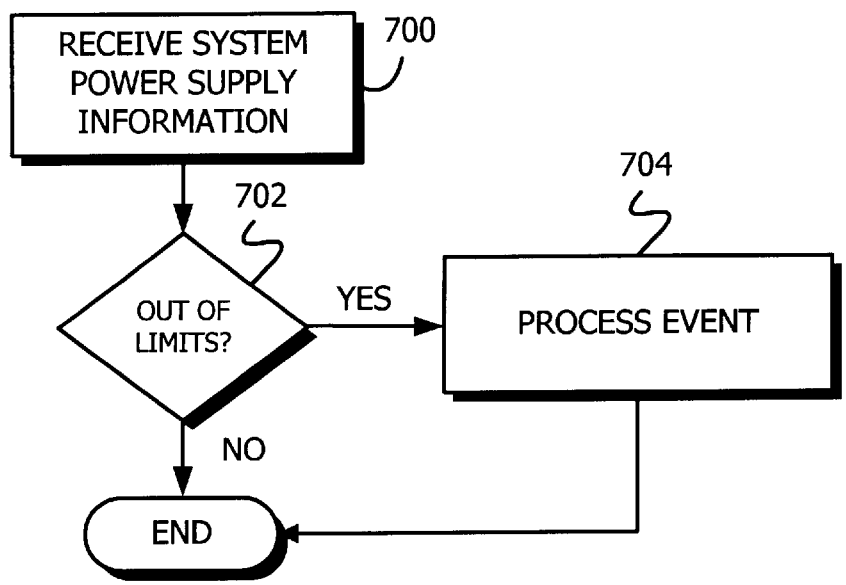
FIG. 7 shows a power supply event response method in accordance with one embodiment of the invention.

Referring now to FIG. 7, when an enabled SMC 102 receives information (step 700) indicating computer system 100's power supply voltages are out of specified ranges from, for example, power management device 148 through I/O interface 206 (the 'yes' prong of step 702), it may process the event by powering down or modifying computer system 100 operating characteristics such as system clock speed and/or recording the event in a log file as described above (step 704).

Figure 8:
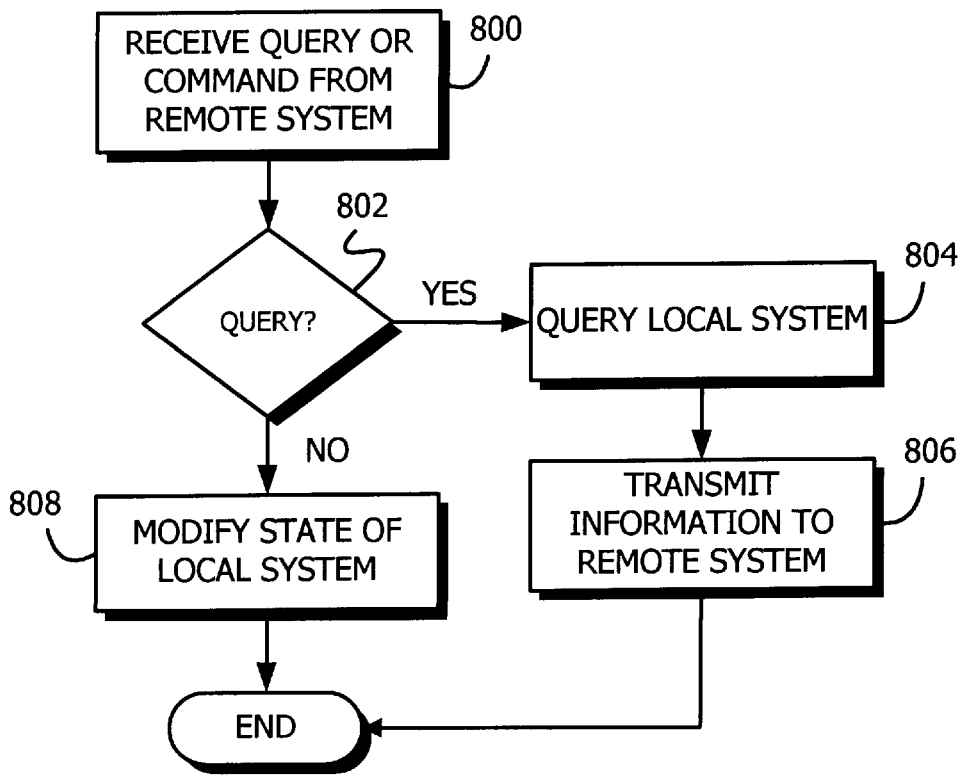
FIG. 8 shows a remote query/command response method in accordance with one embodiment of the invention.

Referring now to FIG. 8, during remote management operations an enabled SMC 102 may be requested to determine or modify the state of various elements of computer system 100 (step 800). If the received request was a query request (the 'yes' prong of step 802), SMC 102 may determine, for example, the state of processor 104 or bridge 122 via bus 152, or the state of an IDE device via IDE interface 126 (step 804). SMC 102 may then transmit the collected state information to the remote computer system (step 806). If the received request was a command (the 'no' prong of step 802), SMC 102 may modify the state of the targeted element (step 808). For example, SMC 102 may modify the state of processor 104's internal registers, or the contents of system FLASH memory 130. SMC 102 may also log each query and/or command to a log file as described above. In the embodiments shown in FIGS. 4 through 8, the routines may be implemented using standard 80386 programming techniques.

A system management controller in accordance with the invention may provide an operating system independent mechanism to regulate (manage, monitor, and control) a computer system. That is, SMC 102 is capable of regulating computer system before power on self test (POST) procedures as well as before, during and after operating system load (boot) operations. Another benefit of a system management controller in accordance with the invention is that the management mechanism may be invoked remotely.

Various changes in the materials, components, and circuit elements of the illustrated embodiments are possible without departing from the scope of the claims. For example, SMC 102 may be implemented as a circuit board comprising discrete logic, integrated circuits, specially designed application specific integrated circuits (ASICs), or combinations of these techniques. SMC 102 may also be implemented as an ASIC device (or collection of devices) directly coupled to the motherboard of computer system 100.

What is claimed is:

1. A computer system comprising:
   a main computing unit including a host processor, and a host bus coupled to the host processor;
   a storage storing an operating system; and
   a system management controller coupled to the main computing unit to determine an operational state of the main computing unit when the main computing unit is being controlled by the operating system and, based on the determination, selectively regulate the main computing unit.

2. The computer system of claim 1, wherein determination of the operational state comprises determining a state of the host processor.

3. The computer system of claim 2, wherein the state of the host processor comprises identification of the contents of a register internal to the host processor.

4. The computer system of claim 1, wherein the system management controller is further configured to modify the determined state of the host processor.

5. The computer system of claim 2, wherein determination of the operational state further comprises determination of a state of a bus device coupled to the host bus.

6. The computer system of claim 5, wherein the bus device comprises a bridge circuit.

7. The computer system of claim 5, wherein the bus device comprises a memory.

8. The computer system of claim 5, wherein the system management controller is further configured to modify the determined state of the bus device.

9. The computer system of claim 1, wherein the system management controller comprises:
   a management processor;
   a management bus coupled to the management processor;
   a communication circuit coupled to the management bus and configured to couple to the main computing unit; and
   memory coupled to the management bus and including a program executable by the management processor to configure the management processor to interact with the communication circuit to perform the regulation.

10. The computer system of claim 9, wherein the system management controller further comprises a modem interface circuit coupled to the management bus.

11. The computer system of claim 9, wherein the system management controller further comprises a circuit coupled to the management bus and configured to receive input signals indicative of main computing unit state.

12. The computer system of claim 11, wherein the main computing unit state comprises an indication of whether the host processor is executing user application program instructions.

13. The computer system of claim 9, wherein the system management controller further comprises a serial interface circuit coupled to the management bus.

14. The computer system of claim 9, wherein the system management controller further comprises a thermal control circuit coupled to the management bus and configured to receive a signal indicative of a thermal state of the main computing unit.

15. The computer system of claim 14, wherein the thermal control circuit is further configured to transmit a thermal control signal to the main computing unit.

16. The computer system of claim 14, wherein the thermal control signal comprises a signal to modify operation of a fan coupled to the main computing unit.

17. The computer system of claim 1, wherein the system management controller is coupled to the main computing unit by a inter-integrated circuit control bus.

18. The computer system of claim 1 including a housing around said main computing unit, said controller detects when said housing has been opened.

19. The computer system of claim 1 including a fan coupled to said controller, said controller detecting when the temperature exceeds a predetermined threshold and in response operating said fan.

20. The computer system of claim 1 including a power supply having a voltage, said controller determining when the power supply voltage exceeds a threshold and in response altering an operating characteristic of said computing unit in response thereto.

21. A method to manage a computer system having a host processor, a bus coupled to the host processor, and a device coupled to the bus, said computer system being controlled by its own operating system, the method comprising:
  receiving a signal indicative of an operating mode of the computer system being controlled by its own operating system; and
  determining if the signal indicates the computer system is operating in a normal mode and, if it is not, then regulating the computer system independently of the host processor.

22. The method of claim 21, wherein regulating comprises determining a state of the host processor.

23. The method of claim 22, further comprising modifying the state of the host processor.

24. The method of claim 21, wherein regulating comprises determining a state of the device.

25. The method of claim 24, further comprising modifying the state of the device.

26. The method of claim 21, wherein receiving a signal comprises receiving a signal from the device.

27. The method of claim 26, wherein the device is a communications device, and the signal represents a command signal.

28. The method of claim 21 including determining whether the housing for said computer system has been opened using a controller coupled to said host processor.

29. The method of claim 21 including determining when a thermal event has occurred using a controller coupled to said host processor and using said controller to control fans to cool said computer system.

30. The method of claim 21 including determining when the power supply voltage has exceeded a threshold and in response thereto using a controller coupled to said host processor to alter the operating characteristics of said host processor.

31. A program storage device, readable by a processor-based system, comprising:
  instructions stored thereon for causing the processor-based system to:
    receive a signal indicative of an operating mode of a computer system being controlled by its own operating system; and
    determine if the signal indicates the computer system is operating in a normal mode and, if it is not, then regulate the computer system independently of a host processor of the computer system.

32. The program storage device of claim 31, wherein the instructions to regulate comprise instructions to determine a state of the host processor.

33. The program storage device of claim 32, wherein the instructions to regulate further comprise instructions to modify the state of the host processor.

* * * * *